Sept. 8, 1953
G. W. WEBER
2,651,749
DIRECT CURRENT SUPPLY SYSTEM
Filed Aug. 11, 1952
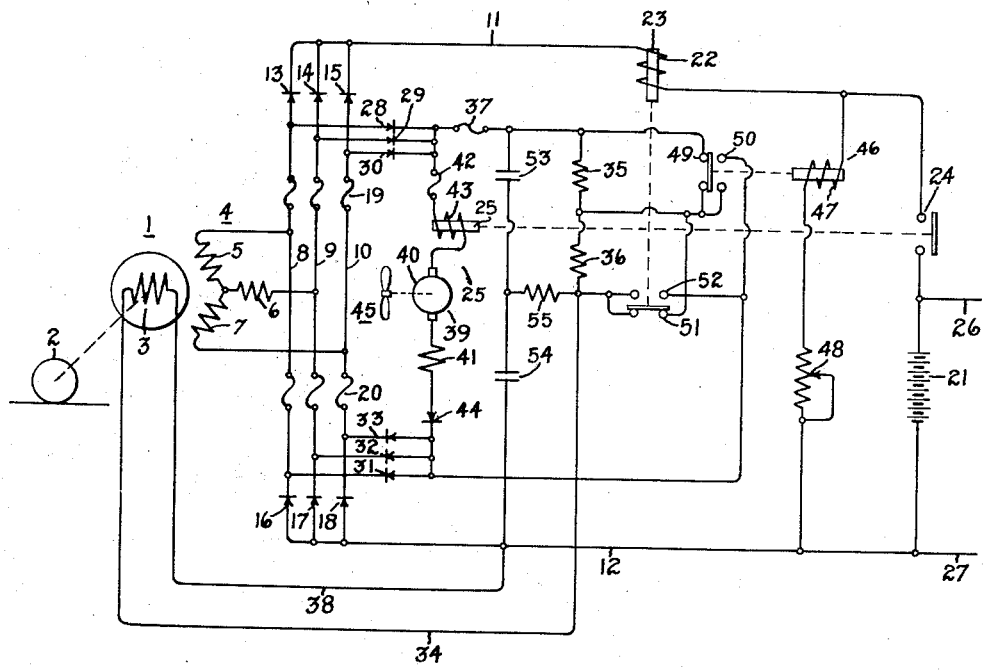
Inventor:
Gay W. Weber,
by Harry P. Mayers
His Attorney.

Patented Sept. 8, 1953

2,651,749

UNITED STATES PATENT OFFICE 2,651,749

DIRECT CURRENT SUPPLY SYSTEM

Gay W. Weber, Erie, Pa., assignor to General Electric Company, a corporation of New York Application August 11, 1952, Serial No. 303,644

5 Claims. (Cl. 320—28)

This invention relates to electrical systems for supplying power to direct current loads and more particularly to power supply systems for vehicles.

In the design of certain vehicles, for example railway rolling stock such as cabooses and passenger cars, it is necessary to incorporate a power supply system in order to provide power for lighting, air conditioning, and more recently communication equipment. Since power must be available when the car is standing still, the conventional practice provides a direct current system including a battery charged by an axle driven generator when the car is in motion and supplying power to the equipment making up the load when the car is not moving. Since the axle driven generator is driven at a variable speed depending upon the speed of the train, it is also necessary to incorporate a voltage regulator in the system to provide a substantially constant output voltage and current limiting means is also necessary in order to limit the power supplied by the system to a predetermined safe value.

In the past, rail vehicle power supply systems have conventionally used direct current commutator-type generators connected to an axle of the car by a belt drive or through a gear drive with a clutch. In such systems, the rated voltage output of the generator is not obtained until the car has reached a reasonably high speed and furthermore, the physical location of the commutator-type generator under the car where it is subject to an unusual amount of dust and dirt from the road bed has resulted in excessively high maintenance.

It is therefore desirable to provide an axle driven power system for supplying direct current to the electrical equipment of a vehicle in which the rated output voltage of the system is obtained at much lower speeds and which does not require the high maintenance of previous systems. It is desirable that such a system utilize an alternator and rectifiers in place of the conventional direct current commutator-type generators and the alternator be self-excited with provision for rapid "build-up" so that full output is obtained at relatively low speeds.

An object of this invention is therefore to provide an improved electrical system incorporating an alternator and rectifiers for supplying direct current to a load.

Further objects and advantages of this invention will become apparent and the invention will be better understood by reference to the following description in the accompanying drawing, and the features of novelty which characterize this invention will be pointed out with particularity in the claims annexed to and forming a part of this specification.

This invention in its broadest aspects provides an alternator having an output winding and a field winding. A main or load rectifier is connected in circuit with the alternator output winding and a load circuit connects the rectifier to the load, for example a vehicle battery. A second or control rectifier is also connected in circuit with the alternator output winding with the alternator field winding and a direct current motor being connected in circuit with the second rectifier. A fan driven by the motor is arranged to cool the rectifiers. Since the excitation for the alternator is obtained from the control rectifier connected to the alternator output, the alternator is self-excited and the operation of the system is completely automatic. A load relay is provided having its operating coil connected in series with the fan motor and its contact connected in the load circuit. Thus, as the alternator output voltage rises and the fan motor is energized from the second rectifier, the load relay is energized responsive to the fan motor current thus connecting the alternator output winding to the battery for charging. An electromagnetic vibratory type voltage regulator is provided having its coil connected across the load circuit and its contacts arranged in circuit with the alternator field winding in order to vary the excitation supplied thereto thereby to regulate the output voltage of the system. The voltage regulator coil is not a constant drain of the battery, however, since the load relay will open when the vehicle is stopped thus disconnecting the voltage regulator coil from the battery. In addition, the flow of reverse current from the battery is prevented by virtue of the blocking action of the main or load rectifiers. In the event that the fan motor stops, its armature current will blow a fuse in the circuit thus opening the circuit of the load relay coil and further, if the fan motor fails to operate due to an open circuit, the load relay will not close. The connection of the fan motor circuit in parallel with the alternator field winding also raises the minimum build-up speed of the system. Another electromagnetic vibratory type regulating device is provided having its coil connected in series with the load circuit and having its contacts also arranged in circuit with the alternator field winding for further varying the excitation supplied thereto thereby to limit the current in the load circuit to a predetermined value.

The single figure of the drawing schematically illustrates the improved power supply system of this invention.

Referring now to the drawing, there is shown an alternator 1 shown schematically as being mechanically connected to the axle of wheel 2 of a rail vehicle. This connection may be a belt drive or a gear drive with an automatic clutch (not shown). The alternator 1 is provided with a field winding 3 and a three-phase output winding 4 having individual winding phases 5, 6 and 7. The alternator output windings 5, 6 and 7 are respectively connected to parallel-connected rectifier bridge legs 8, 9 and 10 which in turn are connected across lines 11 and 12 of the output or load circuit. Main rectifiers 13, 14 and 15 are respectively arranged in lines 8, 9 and 10 between load line 11 and alternator output windings 5, 6 and 7 and main rectifiers 16, 17 and 18 are similarly arranged in lines 8, 9 and 10 between load line 12 and alternator output windings 5, 6 and 7. Each of the lines 8, 9 and 10 is fused intermediate its connection with its associated alternator field winding and the two main rectifiers to which it is connected, as at 19 and 20. Load circuit lines 11 and 12 are connected across battery 21 with operating coil 22 of load limit relay 23 and contact 24 of load relay 25 being arranged in series in line 11. The power output from the system is taken from lines 26 and 27.

In order to supply excitation for the field winding 3 of alternator 1, control rectifiers 28, 29 and 30 are respectively connected to lines 8, 9 and 10 intermediate fuses 19, and main rectifiers 13, 14 and 15, and control rectifiers 31, 32 and 33 are also respectively connected to lines 8, 9 and 10 intermediate fuses 20 and main rectifiers 16, 17 and 18. It will be seen that one side of the alternator field winding 3 is connected to rectifiers 28, 29 and 30 by means of line 34 with resistors 35 and 36 and fuse 37 being interposed in series therewith while the other side of alternating field winding 3 is connected to rectifiers 31, 32 and 33 by means of line 38. A series direct current fan motor 39 is provided having its armature 40 connected to control rectifiers 28, 29 and 30 and its series field winding 41 connected to control rectifiers 31, 32 and 33. A fuse 42, the operating coil 43 of load relay 25, and rectifier 44 are arranged in series with motor 39. Motor 39 is mechanically connected to drive a fan 45 for cooling all of the rectifier elements.

The excitation applied to alternator field winding 3 is controlled by an electromagnetic vibrating contact type voltage relay 46 having an operating coil 47 connected across load lines 11 and 12 with calibrating rheostat 48 being arranged in series therewith. It will be seen that when relay 46 is not energized, its contacts 49, short resistance 35 so that only resistance 36 is in series with alternating field winding 3 and that when it is energized, its contacts 50 completely short the alternating field winding 3. A load limit is provided by a similar electromagnetic vibrating contact type relay 23 having its operating coil 22 connected in series with load line 11. Here, it will be seen that when relay 23 is not energized, its contact 51 shorts resistance 36 and that when it is energized, its contact 52 will also completely short the alternator field winding 3. Capacitors 53 and 54 and resistance 55 serve to suppress arcing on the contacts of voltage regulator 46 and current limiting relay 23.

It will be seen that the constants of the above-described system may be arranged so that the alternator will build up self-excited through the control rectifiers, 28, 29 and 30, and 31, 32 and 33 and that as the alternator output voltage rises, the fan motor 39 is also energized from the control rectifiers. At approximately half of the normal battery charging voltage, the load relay 25 is energized by the fan motor armature current, thus closing its contact 24 connecting lines 11 and 12 to the battery 21 for charging. It will here be noted that the primary purpose of the load relay 25 is to provide a means for disconnecting the operating coil 47 of voltage regulator relay 46 from the battery 21 when the car is not moving. When the speed of the car drops to a point such that the terminal voltage of the main rectifiers 13, 14 and 15 and 16, 17 and 18 drops below the voltage of the battery 21, the blocking action of the main rectifiers prevents the flow of reverse current. As the vehicle speed falls and thus the speed of the alternator drops to zero, the terminal voltage of the control rectifiers also drops to zero thus automatically de-energizing the alternator field 3, the fan motor 39, and the load relay operating coil 43. De-energization of the load relay operating coil opens contacts 24 thus eliminating all the drain on the battery 21.

It has been found desirable to utilize selenium rectifiers in this system, however, the life of such rectifiers is very short at full load without forced cooling. This forced cooling is provided by fan 45 driven by motor 39. Protection against loss of fan cooling is provided by connecting fan motor 39 and the operating coil 43 of load relay 25 in series with fuse 42. Thus, if the motor 39 stops, the armature current will blow the fuse 42 thus opening the circuit of operating coil 43 of load relay 25 to in turn open contact 24, unloading the power rectifiers. Likewise, if the fan motor 39 fails to start due to an open circuit, load contactor 25 will not be energized and contact 24 will not close.

It will be seen that the circuit of the fan motor 39 is connected in parallel with the alternator field winding 3 and that during the beginning of build-up of alternator output voltage, it acts to shunt the field 3, thus raising the minimum build-up speed of the system. To isolate the fan motor 39 from the field circuit during the beginning of build-up, rectifier 44 is connected in series with the fan motor 39. With low voltage across lines 8, 9 and 10, rectifier 44 has a low current density and a very high resistance, forcing essentially all of the current that passes through the control rectifiers 28, 29, 30, 31, 32 and 33 to enter the field circuit. As the voltage rises the decrease in the resistance of said control rectifiers more than compensates for the decrease in the resistance of rectifier 44, allowing the cumulative build-up of voltage to proceed. Thus, a very valuable decrease in the minimum voltage build-up speed is obtained by the addition of series rectifier 44.

The alternator field excitation is controlled by the electromagnetic vibrating contact type voltage regulator 46 when the load current is below a predetermined value, for example, 80 amperes. When the load current raises above this value, a similar current limit relay 23 reduces the field excitation to limit the load current to the desired amount. It will be seen that when voltage regulator 46 is operating, current limit 23 is out of operation and vice versa. It will also be seen that the six branches of the 3 phase main rectifier bridge are fused separately so that the six fuses 19 and 20 provide both alternating current and direct current protection simultaneously. Any short circuit currents that occur must pass through one or more of these fuses and the resultant smaller fuse size gives better and higher speed protection and still provides ample capacity for balanced loads. It will also be noted that the power to the control rectifiers passes through these fuses, thus if the fuses are blown disconnecting the operating coil 47 of voltage regulator 46 from the alternator output, the alternator field winding 3 is also de-energized by the same fuses.

It will now be readily seen that this invention provides an improved direct current power supply system utilizing an alternator rather than a commutator type direct current generator and further characterized by its simplicity and rapid build-up of terminal voltage.

While I have shown and described a particular embodiment of this invention, further modifications and improvements will occur to those skilled in the art. I desire it to be understood, therefore, that this invention is not limited to the form shown and I intend in the appended claims to cover all modifications which do not depart from the spirit and scope of this invention.

What I claim as new and desired to secure by Letters Patent of the United States is:

1. An electrical system for supplying power to a direct current load comprising an alternator having an output winding and a field winding, a first rectifier connected in circuit with said alternator output winding and adapted to be connected to said load, a second rectifier connected in circuit with said alternator output winding, a fan arranged to cool said rectifiers, and a direct current motor mechanically connected to drive said fan and electrically connected in circuit with said second rectifier, a third rectifier electrically connected in series with said motor, said alternator field winding being connected in circuit with said second rectifier.

2. An electrical system for supplying power to a direct current load comprising an alternator having an output winding and a field winding, a first rectifier connected in circuit with said alternator output winding, a load circuit connected to said first rectifier and adapted to be connected to said load, a second rectifier connected in circuit with said alternator output winding exclusive of said first rectifier, a fan arranged to cool said rectifiers, a direct current motor mechanically connected to drive said fan and electrically connected in circuit with said second rectifier, a load relay having contacts in said load circuit and a coil connected for energization responsive to current flow in said direct current motor, and a fuse connected in series with said load relay coil, said alternator field winding being connected in circuit with said second rectifier.

3. An electrical system for supplying power to a direct current load comprising an alternator having an output winding and a field winding, a first rectifier connected in circuit with said alternator output winding and adapted to be connected to said load, a second rectifier connected in circuit with said alternator output winding, a direct current motor electrically connected in circuit with said second rectifier, a third rectifier connected in circuit with said motor, and a fan driven by said motor and arranged to cool said rectifiers, said alternator field winding being connected in circuit with said second rectifier.

4. An electrical system for supplying power to a direct current load comprising an alternator having an output winding and a field winding, a first rectifier connected in circuit with said alternator output winding, a load circuit connected to said first rectifier and adapted to be connected to said load, a second rectifier connected in circuit with said alternator output winding, a fan arranged to cool said rectifiers, a direct current motor mechanically connected to drive said fan and electrically connected in circuit with said second rectifier, a load relay having contacts in said load circuit and a coil connected for energization responsive to current flow in said direct current motor, a fuse connected in series with said load relay coil, said alternator field winding being connected in circuit with said second rectifier, voltage regulating means of the electromagnetic vibratory type having a coil connected across said load circuit and contacts connected in circuit with said alternator field winding for varying the excitation supplied thereto thereby to regulate the output voltage of said system, and a current limiting device of the electromagnetic vibratory type having a coil arranged in series with said load circuit and contacts arranged in circuit with said alternator field winding for further varying the excitation supplied thereto thereby to limit the current in said load circuit to a predetermined value.

5. A battery charging system comprising an alternator having an output winding and a field winding, a first rectifier connected in circuit with said alternator output winding, a load circuit connecting said first rectifier and a battery, a second rectifier connected in circuit with said alternator output winding, a direct current motor electrically connected in circuit with said second rectifier, a third rectifier electrically connected in circuit with said motor, a fan driven by said motor and arranged to cool said rectifiers, said alternator field winding being connected in circuit with said second rectifier, voltage regulating means of the electromagnetic vibratory type having a coil connected across said load circuit and contacts connected in circuit with said alternator field winding for varying the excitation supplied thereto thereby to regulate the charging voltage applied to said battery, and a current limiting device of the electromagnetic vibratory type having a coil connected in series with said load circuit and contacts arranged in circuit with said alternator field winding for further varying the excitation supplied thereto thereby to limit the charging current in said load circuit to a predetermined value.

GAY W. WEBER.

References Cited in the file of this patent

UNITED STATES PATENTS

| Number | Name | Date |
| --- | --- | --- |
| 1,328,321 | Creveling | Jan. 20, 1920 |
| 1,602,787 | Sullivan | Oct. 12, 1926 |
| 1,985,641 | Krapf et al. | Dec. 25, 1934 |
| 2,012,588 | Logan | Aug. 27, 1935 |
| 2,157,840 | Whiting et al. | May 9, 1939 |
| 2,421,645 | Partington | June 3, 1947 |
| 2,519,650 | Hamilton | Aug. 22, 1950 |
| 2,557,298 | Leece et al. | June 19, 1951 |
| 2,558,644 | Claytor | June 26, 1951 |
| 2,607,910 | Ransom et al. | Apr. 19, 1952 |